United States Patent
Snyder et al.

(10) Patent No.: US 6,707,424 B1
(45) Date of Patent: Mar. 16, 2004

(54) INTEGRATED POSITIONING SYSTEM AND METHOD

(76) Inventors: David M. Snyder, 5207 Broadlawn Dr. SE., Cedar Rapids, IA (US) 52403; Leslie D. Baych, 4315 Woodfield La. NE., Cedar Rapids, IA (US) 52402; Bruce D. Melick, 4335 Cloverdale Rd. NE., Cedar Rapids, IA (US) 52411

( * ) Notice: Subject to any disclaimer, the term of this patent is extended or adjusted under 35 U.S.C. 154(b) by 0 days.

(21) Appl. No.: 09/686,181

(22) Filed: Oct. 11, 2000

Related U.S. Application Data (60) Provisional application No. 60/159,239, filed on Oct. 12, 1999.

(51) Int. Cl.$^7$ .............................. G01S 5/02; H04B 7/185
(52) U.S. Cl. .............................. 342/357.14; 342/357.06
(58) Field of Search ........................ 342/357.14, 357.06, 342/386; 701/215

(56) References Cited

U.S. PATENT DOCUMENTS

| | | | |
|---|---|---|---|
| 5,363,108 A | | 11/1994 | Fullerton |
| 5,422,813 A | * | 6/1995 | Schuchman et al. ......... 342/358 |
| 5,563,611 A | * | 10/1996 | McGann et al. ............ 342/389 |
| 5,812,081 A | | 9/1998 | Fullerton |
| 5,999,126 A | * | 12/1999 | Ito ........................... 342/357.1 |
| 6,084,547 A | * | 7/2000 | Sanderford et al. ......... 342/457 |
| 6,178,195 B1 | * | 1/2001 | Durboraw, III et al. ...... 701/215 |
| 6,188,353 B1 | * | 2/2001 | Mitchell ..................... 342/386 |

* cited by examiner

Primary Examiner—Theodore M. Blum
(74) Attorney, Agent, or Firm—McKee, Voorhees & Sease, P.L.C.

(57) ABSTRACT

A system for utilizing two positioning and navigation systems in a single unit which may be used within sight of earth-orbiting GNSS satellites as well as behind a line-of-sight barrier obstructing the earth-orbiting satellites. A mobile receiver/processor includes a GNSS receiver which receives and develops navigation and position information from the signals transmitted by the system of earth-orbiting satellites. The receiver/processor also includes a TM-UWB receiver capable of receiving transmissions from a group of at least three ground-based beacons stationed at precise known locations, each of which independently transmits a distinct TM-UWB signal, including location information. The receiver/processor is provided with programmable memory which holds coordinates of the space where the receiver/processor will be moveable which is behind the line-of-sight barrier. A first antenna exterior to a line-of-sight barrier behind which the receiver/processor will be operated collects signals from the earth-orbiting satellites and passes the collected signals through the line-of-sight barrier to a second antenna which rebroadcasts the collected signals to the receiver/processor when it is in line-of-sight of the second antenna.

31 Claims, 3 Drawing Sheets

INTEGRATED POSITIONING SYSTEM AND METHOD

CROSS REFERENCE TO RELATED APPLICATIONS

This application claims the benefit under 35 U.S.C. §119 (e) and 37 C.F.R. §1.78 of provisional patent application entitled "Integrated and Correlated GNSS/TRADEMARK-UWB Positioning Navigation System", Ser. No. 60/159,239 filed Oct. 12, 1999.

STATEMENT REGARDING FEDERALLY SPONSORED RESEARCH OR DEVELOPMENT

Not Applicable.

FIELD OF THE INVENTION

This invention relates in general to radio positioning/navigation systems. More specifically and in particular, the present invention, hereinafter described in accordance with the current best mode of practice, is such a radio positioning/navigation system that integrates global navigation satellite systems (GNSS) with a time modulated ultra-wide band (TM-UWB) system to provide correlated positioning/navigation data either within a line-of-sight barrier, or in direct line of sight of GNSS beacons. In addition, the present invention overcomes the inherent problems of current radio positioning/navigation systems, such as multi-path signal propagation, the "near-far" problem, and the attenuation of low power signals by a barrier.

BACKGROUND OF THE INVENTION

A common need, and requirement of our society is to accurately track and record positions of aircraft, land vehicles, geographical landmarks, materials, buildings, animals, people, and other objects whether they are located indoors, out of doors, or moving in between. One method currently used to accomplish this goal uses radio positioning/navigation beacons and associated equipment. Radio positioning/navigation can be broadly defined as the use of radio waves to transmit information, which in turn can be received and utilized to determine position and to navigate. Some radio positioning/navigation systems either currently in use or under development, are LORAN, OMEGA, and global navigation satellite systems (GNSS) such as NAVSTAR, GLONASS (the Russian variant), and European systems (GNSS1, GNSS2, NAVSTAT and GRANAS). The radio positioning/navigation systems quickly becoming the standard worldwide are, Global Navigation Satellite Systems (GNSS) including the NAVSTAR Global Positioning System (GPS). The NAVSTAR GPS system is capable of providing real-time, three-dimensional position and navigation data.

The NAVSTAR GPS beacon system presently consists of twenty-four orbiting satellites, spaced in six separate circular orbits, with each accommodating four satellites. Of these, twenty-one are normally operational and three serve as spares. Each NAVSTAR GPS satellite reappears above the same ground reference approximately every twenty-three hours and fifty-six minutes. The spacing of satellites is designed to maximize probability that earth users will always have at least four satellites in good geometrical view for navigational use. The basic method of position determination via radio positioning and navigation signals is derived from the concept of triangulation. The term triangulation used herein refers to the general process of determining distance, a.k.a. range, from the present position to multiple known beacons, and mathematically solving for the point in space which satisfies these conditions. As applied to GNSS, the procedure requires calculation of signal travel time, which, when multiplied by the speed of light, renders distance.

A basic discussion of positioning/navigation as it relates to the NAVSTAR GPS is contained in a document entitled "GPS NAVSTAR Global Positioning System, User's Overview", Reference Document YEE-82-009D, March 1991, prepared by ARINC Research Corporation. This document particularly describes the background of the NAVSTAR Global Positioning System, as well as technical descriptions, performance characteristics and actual user segments. As noted, this book was published in March 1991, and now nine years later the use of NAVSTAR GPS for practical commercial applications has grown immensely.

A process known as differential global positioning (DGPS or DGNSS) compensates for many of the errors which are common in radio positioning/navigation systems. An antenna at a known location receives line of sight (LOS) GNSS signals and broadcasts a signal with current correction adjustments for each satellite which can be received by any differential receiver within its signal range.

Location accuracy via GNSS is continually evolving. Standard GNSS receivers can typically produce position estimates within +/−100 meter accuracy. Sub-meter position accuracy of location can be achieved using DGNSS. Other techniques for improving accuracy are "Carrier-phase GPS", "Wide Area Augmented GPS"(WAAS), and GPS Interferometry.

GNSS relies on no visual, magnetic, or other point of reference which is particularly important in applications such as aviation and naval navigation that traverse polar regions where conventional magnetic navigational means are rendered less effective by local magnetic conditions. Magnetic deviations and anomalies common in standard radio positioning/navigation systems do not hinder GNSS. In addition, GNSS equipment is typically fabricated of standard, solid state electronic hardware, resulting in low cost, low maintenance systems, having few or no moving parts, and requiring no optics. GNSS does not have the calibration, alignment, and maintenance requirements of conventional inertial measuring units, and is available 24 hours per day on a worldwide basis.

During the development of the NAVSTAR GPS program, the United States Government made decisions to extend its use to both domestic and international communities. Its applications range from navigation over the land, in the air, and on the seas, to precision surveys, the tracking of trains and trucks, and even locating undetonated mines left behind in the 1991 Gulf War. As GNSS is rapidly becoming the accepted global standard for positioning/navigation applications when in direct line of sight of beacons, the following discussion focuses on GNSS.

One critical limitation of current GNSS systems is that the beacons are required to be in direct line of sight (LOS) of the receiver. In other words, if the GNSS receiver is used in heavily forested areas, in steep and narrow canyons, within a structure, adjacent to the outer walls of buildings, or behind various other line-of-sight barriers (LSB), the receiver will be unable to obtain a good repeatable reading, or in many cases, any reading at all. While GNSS systems have many important uses in wide open spaces, they are not useable within environments separated by line-of-sight barriers (LSB).

What is needed is a system that is globally correlated and provides repeatable, precise sub-centimeter positioning/navigation data for locating objects in direct line of sight (LOS) of GNSS beacons and within line-of-sight barriers (LSB). The result of such an all-encompassing system is accurate, consistent positioning and navigation data for a wide variety of applications that can be used both in direct line of sight (LOS) of GNSS beacons and within environments that do not allow these signals to penetrate.

In addition to the GNSS information discussed above, other related U.S. patents also deal exclusively with radio positioning/navigation within a line-of-sight barrier (LSB). Such references include, for example, U.S. Pat. No. 5,051,741 to Wesby, an invention directed to a system for locating the position of moveable elements in a wide area and U.S. Pat. No. 5,334,974 to Simms et al. which describes an invention that provides a fully automatic personal security system which combines the advantages of worldwide LORAN-C or GPS navigation with the substantially worldwide communication capabilities of a cellular telephone or communication satellite.

U.S. Pat. No. 4,918,425 to Greenberg et al. discloses an invention that provides a radio system and method for monitoring and locating objects, including individuals, animals and articles, both locally and globally using base stations communicating by ID code with portable transponders which are secured to the objects to be monitored. Another example is the device discussed in U.S. Pat. No. 5,311,185 to Hochstein et al, which is directed to a proximity detection device relying on a transponder that periodically transmits a signal. Transceivers are fixed at locations about a structure for receiving and transmitting signals to establish a location. U.S. Pat. No. 5,363,425 to Mufti et al. incorporates an identification badge having a radio frequency (RF) transmitter. Radio frequency (RF) receivers are located in telephones in various rooms of a structure. The location of the identification tag is determined to be the room with the nearest phone. Anders et al. in U.S. Pat. No. 4,656,463, proposes a passive transceiver tag which is sensed by an active transceiver. This proximity control system forms the basis for a location, identification, and measurement of movement of inventory system, commonly referred to as a LIMIS system.

A system that also addresses positioning and navigation within a line-of-sight barrier (LSB) is referenced in U.S. Pat. No. 5,952,958 to Speasl et al. It is an object of that invention to use GPS-Type RF signals within a line-of-sight barrier (LSB). The practicality of the above referenced patents using RF signals within a line-of-sight barrier (LSB) is limited due to associated problems encountered with multiple signal propagation paths (multi-path) and the "near-far" problem discussed below.

Operation within a line-of-sight barrier (LSB) places fundamental limitations on the performance of radio positioning/navigation systems. The existence of multi-path with different time delays, gives rise to complex, time-varying transmission channels. A direct line-of-site path between beacons and receiver seldom exists within a line-of-sight barrier (LSB), because of interference or reflection from natural or man-made objects, and one must rely on the signal arriving via multi-path. Signals can be received within a line-of-sight barrier (LSB); however to date, the equipment required to mitigate and correct for multi-path remains complex, sophisticated and the process is not repeatable. These multi-path problems, in effect, limit the practical commercial use of radio transmission of positioning/navigation data within a line-of-sight barrier (LSB).

Another dilemma associated with radio transmission of positioning/navigation data within a line-of-sight barrier (LSB) is a phenomenon known as the "near-far" problem. The near-far problem is due to simultaneous broadcasting of signals from multiple broadcast antennae. This problem arises because of the large variation of the user-to-broadcast antennae range. One advantage of using GNSS signals is that the average power being received from the GNSS satellite beacons remains approximately constant due to the large distance of the satellite beacons from the GNSS receiver(s). On the other hand in a local system, the broadcast antenna power from broadcast antennae varies a great deal, due to the inverse proportion to the square of the receiver's distance from the broadcast antennae, and can overwhelm other incoming signals.

Although there have been attempts to use radio positioning/navigation signals within a line-of-site barrier, to date the use of this technology is commercially impractical because of the problems described in the previous discussions.

Departing radically from traditional RF techniques, ultra wideband (UWB) radio is a recent innovation in radio signal transmissions. Ultra wideband provides an innovative solution for local geo-positioning that overcomes multi-path and near-far problems.

A local positioning and navigation system using generic UWB timing signals to overcome multi-path and near-far problems is described in U.S. Pat. No. 6,054,950 to Robert J. Fontana, and is incorporated by reference in this disclosure. This patent teaches precise geolocation without the use of any tethered or cabled equipment, self-synchronization for pulse transmission wireless equipment to eliminate the need for additional cabling between units and a central processor unit (CPU) and a pulse transmission position measuring system including a system that employs self-synchronizing timing signals thereby obviating the need to use an external timing source for determining the position of an object. However, more sophisticated UWB signals are described in U.S. Pat. Nos. 5,952,956 and 5,363,108 to Fullerton et al., and in U.S. Pat. Nos. 5,832,035, 5,812,081, 5,677,927 to Fullerton and are also incorporated by reference. As described in these patents, a time-modulated, ultra-wide band (TM-UWB) system for telecommunications places individual pulses at very precise, repeatable time intervals and transmits the pulses across an ultra wideband spectrum. These digital pulses are low power, produce noise-like signals, are self identified by their timing sequence, and are capable of having data injected onto the timing sequence. The digital portion of this pulse technology allows for transmission of data, video, and voice at extremely high-speed transmission rates. The pulse-timing portion of this technology also provides for positioning and navigation. Radar applications are an additional use of this technology.

Historically, the only way to transmit radio signals such as voice, music, TV, data, etc., has been via continuously oscillating radio waves. Digital pulse technology, as referenced in U.S. Pat. Nos. 5,952,956 and 5,363,108 to Fullerton et al., and U.S. Pat. Nos. 5,832,035, 5,812,081, 5,677,927 to Fullerton transmits pulses of energy instead of waves. TM-UWB technology uses impulse transmitters to emit ultra-short "Gaussian" monocycle pulses with a tightly controlled pulse-to-pulse interval. Most recently, IBM Microelectronics Corporation has developed two proprietary chips which are fabricated from advanced silicon germanium for use in TM-UWB transmitters and receivers. These chips precisely control pulsation timing and correlation to within a few trillionths of a second (pico-seconds). These monocycles are resistant to multi-path fading and provide extremely high data transmission rates. Each digital pulse can represent a 1 or a 0, and are not frequency dependent, hence they can be transmitted across a wide spectrum. TM-UWB pulse technology offers a viable solution to data transmission because it does not compete with the currently crowded radio wave spectrums. This technology provides a large number of operational capabilities beyond traditional oscillating radio wave transmission systems.

A basic discussion of impulse radio can be referenced in an article entitled "Impulse Radio: How It Works", published in *IEEE Communications Letters*, Vol. 2, No. Feb. 2, 1998. This article specifically explains the rationale for impulse radio technology, and the ability to employ this technology to solve many of the difficult problems encountered using wireless transmissions indoors. Additional discussions of the robustness of TM-UWB signal use can be referenced in an article entitled, "Ultra-Wide Bandwidth Signal Propagation for Indoor Wireless communications" published in June 1997 by the EEE International Conference on Communications in Montreal, Canada.

TM-UWB technology has a number of beneficial characteristics. One is security. Due to the astounding number of possible combinations of timing sequences, it is statistically impossible to decode this type of transmission unless the required complex code is used by both transmitting and sending devices. Another by-product of the tremendous number of combinations is the unlikely chance for signal interference. The signals are so random and low powered that they are indistinguishable from background noise. Another beneficial characteristic of the system is that it operates at very low power spectral densities and does not need a power amplifier for signal transmission. TM-UWB systems consume substantially less power than existing conventional radios. Another beneficial characteristic of the system is that hardware is relatively simple to manufacture and costs substantially less than what is currently required to build spread spectrum radios and related equipment.

The TM-UWB system can provide local geopositions with sub-centimeter accuracy. This is achieved due to the precise timing of outgoing and incoming pulses. It is important to note that TM-UWB is not a global positioning/ navigation system. Although multi-mile ranges are capable with this technology, it does not provide global integration with GNSS positioning/navigation systems.

Therefore, there is a common need in society for a system that utilizes both GNSS and TM-UWB technologies to provide positioning/navigation capabilities both in direct line of sight (LOS) of GNSS beacons, and within a line-of-sight barrier (LSB) using TM-UWB beacons. None of the geopositioning systems discussed in the prior art meet these needs because they are either 1) local systems only, 2) imprecise, 3) do not work indoors and outdoors, or 4) are not cost effective due to multi-path and near-far problems.

SUMMARY OF INVENTION

The present invention provides a system for utilizing two positioning and navigation systems in a single unit which may be used within sight of earth-orbiting GNSS satellites as well as behind a line-of-sight barrier obstructing the earth-orbiting satellites. A receiver/processor which is mobile, such as might be carried on a forklift in a warehouse with indoor and outdoor storage areas, includes a GPS receiver which receives and develops navigation and position information from the signals transmitted by the system of earth-orbiting satellites. The receiver/processor also includes a TM-UWB receiver capable of receiving transmissions from a group of at least three ground-based beacons stationed at precise known locations, each of which independently transmits a distinct TM-UWB signal, including timing and location information. The receiver/processor is provided with programmable memory which holds coordinates of the space in which the TM-UWB receiver is to be utilized to develop location and navigation information to the exclusion of the GPS receiver of the unit. A first antenna exterior to any line-of-sight barrier behind which the receiver/processor will be operated, that is, atop the building in which the mobile receiver/processor is to be used, collects signals from the earth-orbiting GNSS satellites and passes the collected signals through the roof or other line-of-sight barrier to a second antenna which rebroadcasts the collected signals.

The receiver/processor receives the retransmitted satellite data signals while behind the line-of-sight barrier, (e.g. within the building) such that the GPS receiver will remain active and will not need a period of warm-up once the mobile receiver/processor leaves the building and may receive signals directly from the earth-orbiting satellites. The onboard storage is interrogated by the receiver/ processor to determine when the receiver/processor has left the space in which the GNSS signals received are to be disregarded. Hereinafter, separation by a line of sight barrier is referred to as "within a line-of-sight barrier" (LSB).

The present invention also provides a cost effective method for overcoming problems associated with multiple signal propagation paths and relative proximity of simultaneously transmitting antenna within a line-of-sight barrier (LSB). None of the geopositioning systems discussed in the prior art meet these needs because they have one or more of the following shortcomings 1) local systems only, 2) imprecise, 3) do not work indoors and outdoors, 4) are not cost effective due to multi-path and near-far problems, 5) require synchronization of timing signals from multiple beacons, or 6) rely solely on a single use timing signal.

The present invention differs from the systems described in the prior art because it is a comprehensive system for precise, global positioning and navigation, both in direct line-of-sight (LOS) of GNSS beacons and within a line-of-sight barrier (LSB). The present invention utilizes TM-UWB telecommunication pulses as a timing signal which is a cost effective method for overcoming problems associated with multi-path and near-far within a line-of-sight barrier (LSB). The present invention does not deal with real-time kinematic position and navigation solutions, and therefore does not require synchronization of timing signals from multiple beacons.

Globally, in direct line of sight (LOS) of GNSS beacons, the present invention utilizes GNSS ephemeris and pseudo-random noise signals to determine positioning and navigation information. Current ephemeris and GNSS system operational status is relayed via GNSS re-radiation antennae located within the line-of-sight barrier (LSB). This information is necessary to keep the GNSS receiver portion of the receiver/processor activated for applications in direct line of sight (LOS) of GNSS beacons. Optional correction signals from a DGNSS differential antenna and receiver may be used to enhance accuracy.

Locally, within a line-of-sight barrier (LSB), the present invention utilizes TM-UWB pseudo-random noise signals to determine positioning and navigation information. The term "locally" as it is used herein, refers to the part of the system that can be used indoors and outdoors within the multi-mile range of TM-UWB beacons. TM-UWB beacons may be located within, or outside a line-of-sight barrier (LSB). The TM-UWB beacons must be non-coplanar, in order to determine altitude. The receiver/processors and TM-UWB beacons are parts of a system which communicate with each other in order to determine positioning and navigation data locally. The present invention integrates and correlates GNSS and TM-UWB positioning and navigation data into a seamless format.

The present invention specifically includes receiver/processors, TM-UWB beacons at known locations, GNSS signal re-radiation antennae, and an optional host computer which can provide enhanced information services. A receiver/processor includes a GNSS receiver/processor, a TM-UWB receiver/processor, a micro-processor with solution software to integrate and correlate GNSS and TM-UWB positioning and navigation data memory, and a wireless data link to communicate with other receiver/processors and optional host computer. The receiver/processor may be contained in such devices as, but not limited to, an RFID tag, a cell phone, a computer, or a personal digital assistant (PDA).

The present invention provides positioning and navigation information by utilizing GNSS and/or TM-UWB signals which are processed geometrically using triangulation and/or tri-lateralization techniques which yield positioning and navigation data. The receiver/processor also uses a wireless data link to communicate with other receiver/processors, or with an optional host computer. The optional host computer is used to store, calculate, and deliver enhanced positioning and navigation information for various applications.

It is an object of the present invention to utilize TM-UWB technology for determining the positions of objects locally.

It is another object of the present invention to utilize TM-UWB technology for determining the positions of objects within a line-of-sight barrier.

It is a further object of the present invention to utilize TM-UWB to overcome problems such as multi-path signal propagation, and the "near-far" problem associated with current radio positioning/navigation systems.

It is a further object of the present invention to integrate and correlate the position/navigation information from both GNSS systems and a TM-UWB system for locating objects.

It is a further objection of the invention to provide a system which may provide location and navigation information to a moving object on a real-time basis by using either a time-multiplexed ultra wide band data transmission scheme or the GNSS system or both, whether the objection is moving within the line of sight of GNSS satellite or not. These and other objects will be better understood from review of the detailed description which follows and in which the following definitions are applicable.

DEFINITIONS

Global Navigation Satellite System (GNSS)—A generic term for specific systems such as the Russian GLONASS and the United States NAVSTAR GPS, utilizing equipment which receives signals from a relevant constellation of navigational satellites in earth orbit.

NAVSTAR Global Positioning System (NAVSTAR GPS)—The United States Government's satellite navigation system which broadcasts time and ranging data globally. Designed to provide a highly accurate, reliable, continuous 24-hour, worldwide coverage for position reporting and navigation.

Differential Global Positioning System (DGPS) or Differential Global Navigation Satellite System (DGNSS)—A positioning system which also includes an antenna that is precisely surveyed to a known location. The antenna receives GPS signals and broadcasts current correction data for each satellite which can be received by a DGPS antenna. Location accuracy within one meter can be achieved.

Line-of-Sight—(LOS) Unobstructed linear signal path between radio positioning/navigation transmitters and receiving antennae.

Line-of-Sight Barrier—(LSB) Any barrier, solid or non-solid, that restricts direct linear receipt of any radio positioning/navigation signal.

Locally—Refers to the part of the system that can be used indoors and outdoors within the multi-mile range of TRADEMARK-UWB beacons.

Time Modulated Ultra-Wide Band (TRADEMARK-UWB)—System that transmits very low power radio signals with very short pulses using very wide signal bandwidths. The pulses are transmitted at ultra precise, nearly random intervals, and frequencies to convey data using a technique called pulse position modulation.

Ultra Wide Band—System that transmits very low power radio signals with very short pulses using very wide signal bandwidths.

Beacon—A device that emits radio signals for positioning/navigation purposes. Radio Frequency (RF)—Radio transmission of data.

Receiver—Hardware that is capable of receiving either GNSS or TRADEMARK-UWB radio positioning/navigation signals Transceiver—Hardware that is capable of receiving and transmitting radio positioning/navigation signals or data from either GNSS or TRADEMARK-UWB systems.

Geographical Information System (GIS)—Any information system that is designed to work with data referenced by spatial or geographic coordinates. A GIS is both a database system with specific capabilities for spatially-referenced data, as well as a set of operations for mapping and analyzing the data.

Wide Area Augmentation System (WAAS)—A system where a network of ground reference stations monitors GNSS satellite signals and passes the information to a Master Station. The Master Station uplinks correction data to Geo-stationary satellites (not the GNSS navigation satellites) which in turn downlink the correction data to a user's GNSS receiver. This system is designed to improve integrity, accuracy, availability, and continuity of service, with a view to accuracy being compatible with aircraft approach and landing aids, and other uses where such accuracy is required.

Triangulation—Any mathematical procedure to calculate position based on the intersection of ranges from known points (includes all variations such as tri-lateralization and resection, etc., whether or not angles, per se, are used).

DETAILED DESCRIPTION OF THE INVENTION

The present invention is now described with reference to the figures wherein like reference numbers denote like elements. The present invention is a system which can locate receiver/processors 150, 150', which are mobile, in real-time, with sub-meter accuracy when operating in direct line-of-sight (LOS) of GNSS beacons 101, 102, 103, 104, or within a line-of-sight barrier 100 using time-modulated, ultra wide band beacons 130, 131, 132, 133 a time-modulated, ultra-wide band (TM-UWB) system for telecommunications places individual pulses at very precise, repeatable time intervals and transmits the pulses across an ultra wideband spectrum. These digital pulses are low power, produce noise-like signals, are self identified by their timing sequence, and are capable of having data injected onto the timing sequence. The TM-UWB beacons 130, 131, 132, 133 are shown outside the line-of-sight barrier (LSB) 100, but may also be located within the line-of-sight barrier (LSB) 100. The TM-UWB beacons are shown on the line-of-sight barrier 100, but may be located at any elevation or structure that is geometrically efficient for the environment. In the present invention, positioning/navigation is accomplished using a receiver/processor 150, 150' which integrates GNSS and TM-UWB hardware, and the data is correlated using commercially available software with a micro-processor. The micro-processor is part of the receiver/processor 150, 150' which is described fully in FIG. 2. In describing the present invention, those skilled in the art and familiar with the instant disclosure of the present invention will recognize additions, deletions, modifications, substitutions, and other changes which will fall within the purview of the subject inventions and claims.

Figure 1:
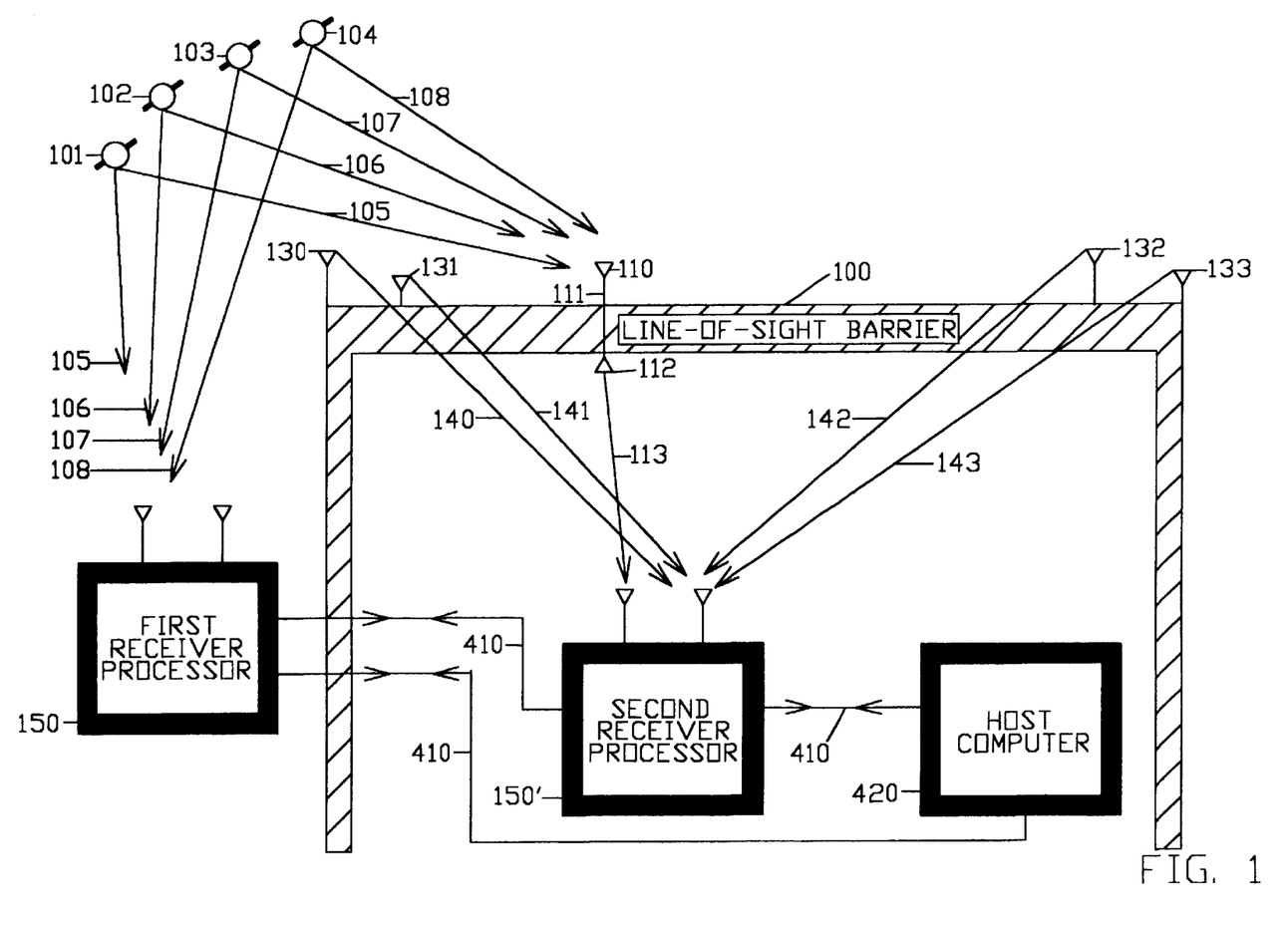
FIG. 1 is a schematic representation of the present invention wherein location and time data is used by receiver/processors to determine position. When operating in direct line of sight of GNSS beacons, the GNSS portion of the receiver/processor is used. When operating locally, or within a line-of-sight barrier, the TM-UWB portion of the receiver/processor is used in conjunction with TM-UWB beacons.

FIG. 1 illustrates the general configuration of the present invention where a receiver/processor 150, 150' is operating in direct line of sight of GNSS beacons 101, 102, 103, 104, or within a line-of-sight barrier 100 utilizing TM-UWB beacons 130, 131, 132, 133. The line-of-sight barrier 100 may be a solid or non-solid barrier. Examples of a solid line-of-sight barrier 100 include, but are not limited to, the roof of a structure, a heavy tree canopy, steep and narrow canyon walls, the walls of tall buildings, or the walls of any enclosure. Examples of non-solid line-of-sight barriers 100 would include, but are not limited to, atmospheric anomalies, magnetic fields, etc.

The basic necessary elements of this system are shown and used to determine the positioning and navigational coordinates of a receiver/processor 150, such as receiver/processor 150 operating in direct line of sight of GNSS beacons 101, 102, 103, 104, or equivalent receiver/processor 150' operating behind a line-of-sight barrier 100 by using TM-UWB beacons 130, 131, 132, 133.

Each TM-UWB beacons 130, 131, 132, 133 transmits distinct, complex, coded pulses of radio energy. Pulses are read by receiver/processor 150, 150', by timing the incoming pulses to within a few trillionths of a second. Ten million to 60 million pulses are generated per second. The pulses are timed according to a complex code that is shared by the sender and the receiver. It is this precise timing of pulses that can be used for local positioning and navigation. Using TM-UWB pulses negates the problems associated with multi-path signal propagation and near-far. TM-UWB pulses are designed to work with modern telecommunications systems to securely carry voice, radio, TV, and/or data as opposed to the more generic UWB pulses which are not designed to do this.

For clarity, the TM-UWB beacons 130, 131, 132, 133 are shown located outside the line-of-sight barrier 100, but they also may be located within a line-of-sight barrier 100. These TM-UWB beacons 130, 131, 132, 133 are at known locations. The TM-UWB beacons 130, 131, 132, 133 are arranged in a geometrical pattern that is efficient for accurate triangulation with either a two or three-dimensional positioning/navigation system, as applicable. Specifically, it should be noted that in a two-dimensional system the operating centers of the beacons are not all located co-linear and in a three-dimensional system the operating centers of the beacons are not all located co-linear or co-planar.

The pulse transmission paths 140, 141, 142, 143 are the shortest distances from the known location, TM-UWB beacons 130, 131, 132, 133 to the second receiver/processor 150' which is operating within the broadcast range of the TM-UWB beacons 130, 131, 132, 133. For clarity, the first receiver/processor 150 outside the line-of-sight barrier 100 is shown receiving signals only from the GNSS beacons 101, 102, 103, 104 via GNSS receiver antenna 152. The first receiver/processor 150 outside the line-of-sight barrier 100 is also capable of receiving signals from TM-UWB beacons 130, 131, 132, 133 via TM-UWB receiver antenna 151, if they are within broadcast range. Likewise, if TM-UWB beacons 130, 131, 132, 133 are located within a line-of-sight barrier 100, the first receiver/processor 150 operating outside the line-of-sight barrier 100 is capable of receiving the signals via TM-UWB receiver antenna 151, if they are within broadcast range. It is important to note the second receiver/processor 150', operating within the line-of-sight barrier 100, is capable of only direct receipt of TM-UWB beacons 130, 131, 132, 133 via TM-UWB receiver antenna 151, for positioning and navigation.

The first or second receiver/processor 150, 150' uses the positioning/navigation data received from the GNSS beacons 101, 102, 103, 104, and/or TM-UWB beacons 130, 131, 132, 133 to collect data for positioning and navigation. This positioning and navigation data may be optionally transmitted via radio transmission path 410 to either another receiver/processor 150, 150' or to host computer 420 for further analysis or use. Specifically, in a three-dimensional system the operating center of the GNSS beacons 101, 102, 103, 104 or the TM-UWB beacons 130,131, 132, 133 cannot all be located co-planar. The radio transmission paths 105, 106, 107, 108 are the shortest distances from the GNSS beacons 101, 102, 103, 104 via GNSS receiver antenna 152, to the first receiver/processor 150, or GNSS antenna 110 operating in direct line of sight of the GNSS beacons 101, 102, 103, 104. The pulse transmission paths 140, 141, 142, 143 are the shortest distances from the TM-UWB beacons 130, 131, 132, 133, via TM-UWB receiver antenna 151, to the second receiver/processor 150' which is operating within a line-of-sight barrier 100.

TM-UWB beacons 130, 131, 132, 133 are selectively located at known locations relative to the user's choice of system coordinates. The global position of a TM-UWB beacon 130, 131, 132, 133 may be determined by survey, or the TM-UWB beacon 130, 131, 132, 133 may self-determine global position when outfitted with a GNSS receiver.

Figure 2:
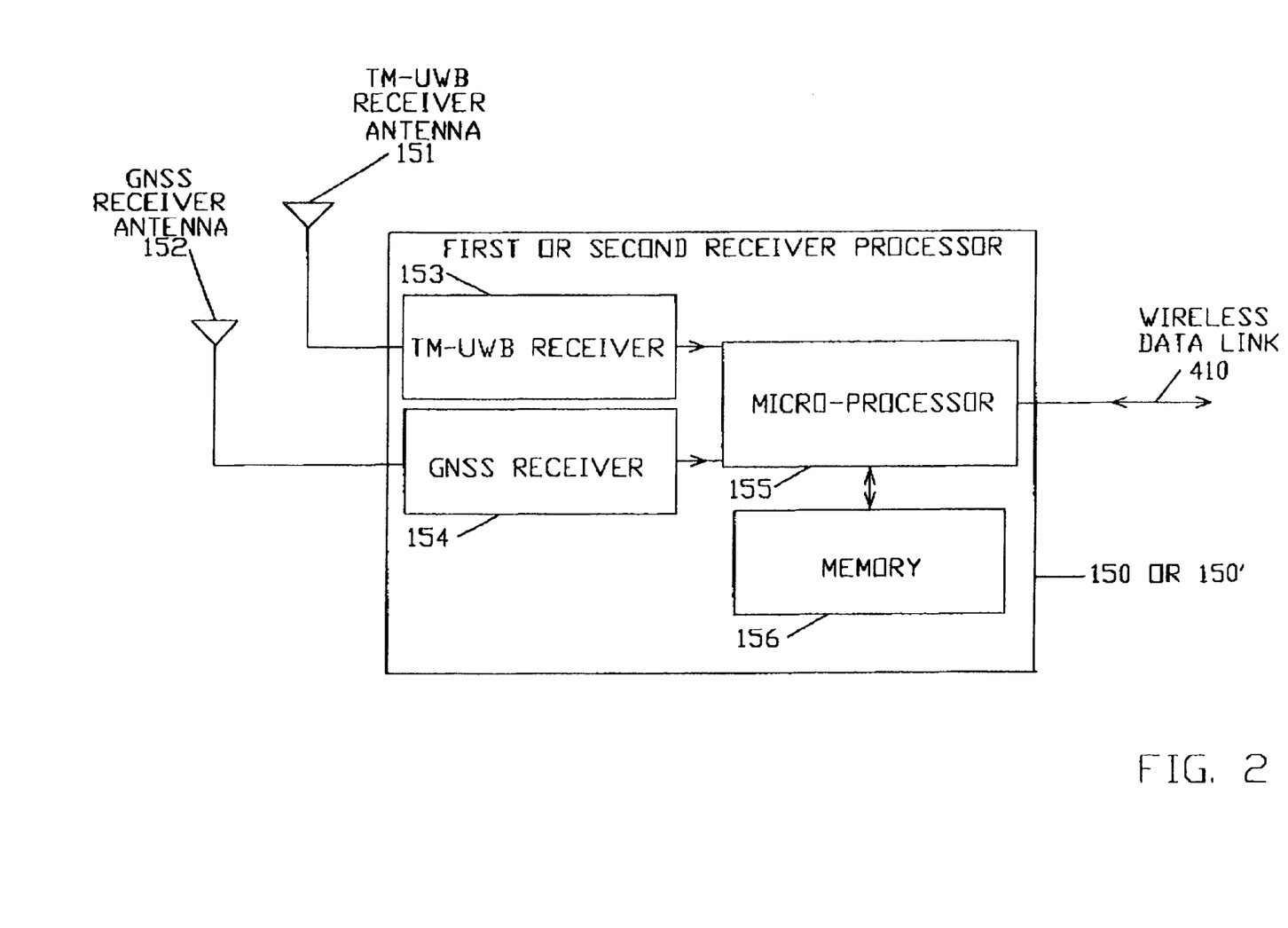
FIG. 2 is a block diagram of the receiver/processor used in the present invention.

Pulse transmission paths 140, 141, 142, 143 are used for local positioning calculations, and explanations are developed and utilized as follows. Each TM-UWB beacon 130, 131, 132, 133 has known Cartesian coordinates ($X_{130}$, $Y_{130}$, $Z_{130}$), ($X_{131}$, $Y_{131}$, $Z_{131}$), ($X_{132}$, $Y_{132}$, $Z_{132}$), ($X_{133}$, $Y_{133}$, $Z_{133}$) respectively, which are separated from coordinates ($X_{150'}$, $Y_{150'}$, $Z_{150'}$) of second receiver/processor 150' by a distance represented by pulse transmission paths 140, 141, 142, 142 respectively. TM-UWB beacons 130, 131, 132, 133 broadcast a repeating TM-UWB pulse train of constant time duration consisting of a synchronization burst and additional data identifying the source of transmission—e.g., unit serial ID, coordinates. The synchronization burst of electromagnetic energy acts as a timing pulse which is received at the second receiver/processor 150'. Since the exact positions of TM-UWB beacons 130, 131, 132, 133 are known, a conventional micro-processor 155 running solution software, as shown in FIG. 2, can determine the exact time of transmission of the pulses emitted based on knowledge of the transit time of arrival of the pulses as measured by the TM-UWB receiver 153, as shown in FIG. 2, and the transit time for the pulses to reach the second receiver/processor 150'. Here, the distance between the second receiver/processor 150' and each TM-UWB beacons 130, 131, 132, 133 is the transit time of the pulses from each beacon multiplied by the speed of pulse propagation (e.g., the speed of light for transmission in free space). When more than four TM-UWB beacons 130, 131, 132, 133, are used, the set of equations are over specified (more equations than unknowns) and the optimum solution can be obtained via a least mean squares (LMS) approach, as described in Widrow, B. and S. Stearns, Adaptive Signal Processing, Prentice-Hall, N.J., 1985, Chapter 6.

In order to calculate the position of a receiver/processor 150, 150' operating locally outside of, or within a line-of-sight barrier 100, normal vector geometry techniques, which are well known in the art, are utilized by the micro-processor 155, as shown in FIG. 2. The solution may be correlated to any global or local co-ordinate system. The coordinates which represent position, or discrete locations, which can be averaged over time for navigation purposes, may be transferred via wireless data link 410 to the optional host computer 420. The following are examples of the enhanced information services provided by the optional host computer 420:

GIS maps for two- and or three-dimensional positioning and navigational purposes.

Database for positioning and navigational analysis.

Transmission to another receiver/processor 150, 150'

Although the forgoing detailed description of the present invention describes specific use of GNSS beacons 101, 102, 103, 104, and TM-UWB beacons 130, 131, 132, 133 it is to be understood that certain aspects thereof are not limited solely to use with such positioning/navigation systems and may be used with signals received from other sources.

The GNSS antenna 110 operating in direct line of sight of GNSS beacons 101, 102, 103, 104 receives ephemeris, almanac, and positioning/navigation data via transmission paths 105, 106, 107, 108. The ephemeris, almanac, and positioning/navigation data is passed through the line-of-sight barrier 100 via transmission path 111 to re-radiating antenna 112. This data is transmitted via transmission path 113 to the second receiver/processor 150' to allow the GNSS receiver 154, as shown in FIG. 2, to remain activated.

Optionally, the system's accuracy and integrity can be verified and calibrated by comparing the first or second receiver/processors 150, 150' calculated position to a fixed, known position at scheduled or random intervals.

FIG. 2 illustrates the general configuration of a first or second receiver/processor 150, 150' used in the present invention. A user programmable memory 156 is associated with microprocessor 155 such that coordinates defining the space where no line of sight exists between GNSS beacons 101, 102, 103, 104 and receiver/processor 150, 150' may be stored in memory 156 and accessed by microprocessor 155. The TM-UWB receiver 153 is multi-channel and simultaneously receives signals from multiple TM-UWB beacons 130, 131, 132, 133, via TM-UWB receiver antenna 151. The micro-processor 155 processes the TM-UWB signals and determines local positioning/navigation data. When required, this data is available for integration and correlation with GNTSS receiver 154 data for use in a seamless, global indoor-outdoor positioning system.

The GNSS receiver 154 receives signals via GNSS receiver antenna 152. The micro-processor 155 processes these direct line-of-sight GNSS signals and determines global positioning/navigation data.

Optionally, sub-meter accuracy can be obtained for the signals received from GNSS beacons 101, 102, 103, 104, as shown in FIG. 1, may be determined and applied to the present invention using differential positioning (DGNSS).

The micro-processor 155 integrates and correlates the TM-UWB and GNSS positioning/navigation data, and transmits to an optional host computer 420, as shown in FIG. 1, via wireless data link 410. The wireless data link 410 may be used to communicate with multiple receiver/processors.

In order to create a seamless, global positioning/ navigation system the micro-processor 155 is programmed to define the space to be used within the range of TM-UWB beacons 130, 131, 132, 133, as shown in FIG. 1. This space is continuously monitored by the first and second receiver/ processors 150, 150'. When the first or second receiver/ processor 150, 150' is within this defined space the TM-UWB receiver 153 is activated. When the first or second receiver/processor 150, 150' is outside this defined space the GNSS receiver 154 is activated and receives standard GNSS signals directly from GNSS beacons 101, 102, 103, 104, via GNSS receiver antenna 152, as shown in FIG. 1. Standard GNSS signals and receivers are known and commonly used in the art for global positioning and navigation outside a line-of-sight barrier.

An example of utilizing the present invention includes the following. A receiver/processor 150, 150' is mounted on a forklift in a manufacturing or warehouse facility. When operating within a defined space of the range of TM-UWB beacons 130, 131, 132, 133, or indoors within a line-of-sight barrier 100, the receiver/processor 150, 150' uses TM-UWB beacons 130, 131, 132, 133 for marking locations of inventory. When the forklift goes outside the defined space of the range of TM-UWB beacons 130, 131, 132, 133, or outside a line-of-sight barrier 100, the receiver/processor 150, 150' uses signals directly from GNSS beacons 101, 102, 103, 104, to mark locations of outdoor inventory.

The TM-UWB receiver 153 of the mobile receiver/ processor 150 receives distinct streams of data transmitted from the TM-UWB beacons 130, 131, 132, 133, each beacon 130, 131, 132, 133 transmitting independently of the others and sending information about its time of transmission and location. An ultra-wide-band receiver has been generally described in the patent to Fontana, U.S. Pat. No. 6,054,950, the contents of which are incorporated herein by reference. However, the system described by Fontana requires that the beacons transmit UWB pulses only, and that the beacons be sequentially related or timed exactly to transmit the data needed. The present system requires that the TM-UWB beacons 130, 131, 132, 133 each send time and location data independently, in continuous repetition, such that receiver/processor 150 or 150' may acquire data contemporaneously from at least three of the beacons 130, 131, 132, 133 to calculate location and navigation data therefrom. However, the present system invention also provides that the receiver/processor 150 include a GNSS receiver 154 capable of receiving navigational signals from GNSS beacons 101, 102, 103, 104. Additionally each of first and second receiver/processor 150, 150' are provided with onboard programmable memory 156 in which may be stored coordinate data relative to the space in which the receiver/processor 150, 150' may be operated which is behind a line-of-sight barrier 100 from the array of earth-orbiting satellites 101, 102, 103, 104. The receiver/processor 150, 150' interrogates the onboard memory 156 to compare current location information regarding the position of receiver/processor 150, 150' with the space coordinates stored in the memory 156.

As seen in FIG. 1, first receiver/processor 150 is shown as exterior to the line-of-sight barrier 100 but it is functionally equivalent to second receiver/processor 150' which is in position within line-of-sight barrier 100. However, the GNSS receiver 154 of first receiver/processor 150 is enabled to deliver location and navigation information while the GNSS receiver 154 of second receiver/processor 150' is active but its calculated location information is disregarded because it is not with the line-of-sight of the GNSS beacons 101, 102, 103, 104.

If receiver/processor 150, 150' determines that it is located within the defined space coordinates stored in memory 156, then receiver/processor is instructed by a suitable algorhythm to disregard the GNSS data being received by the GNSS receiver 154 of the receiver/processor 150, 150' and the location and navigation information regarding the receiver/processor 150, 150' is determined by triangulation from the TM-UWB signals transmitted by the array of at least three TM-UWB beacons 130, 131, 132, 133 and received by the TM-UWB receiver 153 of the receiver/processor 150, 150'.

Figure 3:
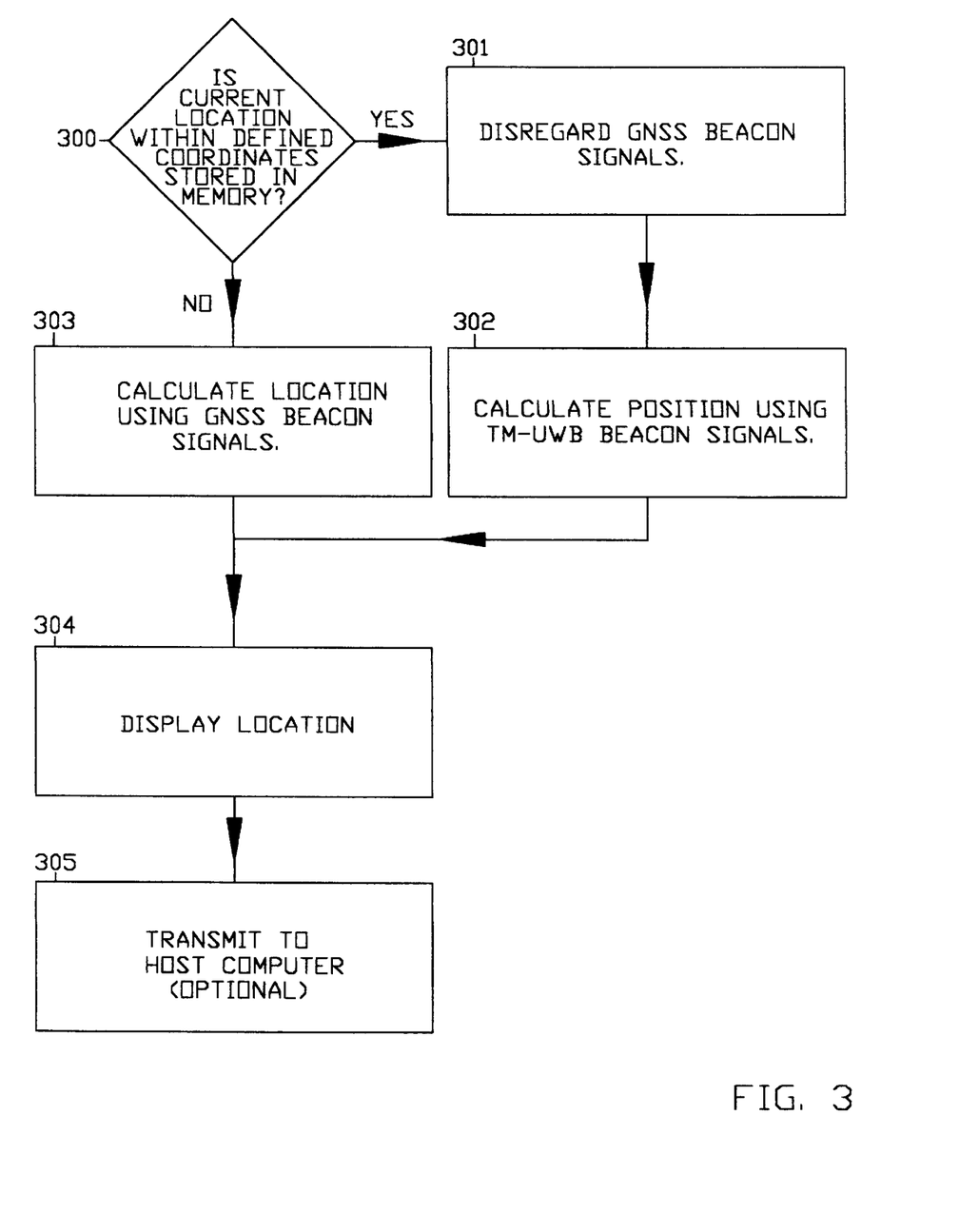
FIG. 3 is a flow chart of a software routine for choosing the receiver/processor elements to be operated to obtain location data.

FIG. 3 depicts a flow chart for the algorhythm which instructs either receiver/processor 150 or 150'. FIG. 3 shows that receiver/processor 150', for instance, interrogates the onboard memory 156 at step 300 to determine if receiver/processor 150' is within the defined space stored in the memory 156. If it is, the receiver/processor 150' at step 301 disregards the GNSS signals received by it because the receiver/processor 150' is behind the line-of-sight barrier 100, such as within a warehouse building whose perimeter coordinates have been entered in the memory 156. Then receiver/processor 150' employs the TM-UWB receiver 153 at step 302 to calculate the position of receiver/processor 150' behind the line-of-sight barrier 100 from signals received from the TM-UWB beacons 130, 131, 132, 133. The resulting location and navigation information provided by the TM-UWB receiver 153 can be used to display location, as at step 304, to the user of the receiver/processor 150', or the location of the receiver/processor 150' may be communicated by RF or hardwiring, or other communication methods, to an optional host computer 420, as at step 305. If at step 300, interrogation of memory 156 indicates that the receiver/processor 150' is outside the line-of-sight barrier 100 as depicted for receiver/processor 150 in FIG. 1, that is, within sight of at least three of the GNSS beacons 101, 102, 103, 104, then receiver/processor 150 employs the GNSS receiver 154 to calculate its position and other available navigation data from signals transmitted by at least three of the GNSS beacons 101, 102, 103, 104. Then the information may be displayed as at step 304, and optionally transmitted to the host computer 420, at step 305.

While the present invention describes a system for providing integrated and correlated GNSS and TM-UWB data to receiver/processors operating either in direct line-of-sight of GNSS beacons, or locally outside of, or within a line-of-sight barrier when using TM-UWB beacons, it is contemplated that variations and modifications will be developed within the teaching of the present disclosure.

Having described the invention, we claim:

1. Apparatus to determine the location and navigational movement of a unit on or near the surface of the earth comprising a system of earth-orbiting satellites, each satellite transmitting distinct time and position data identifiable with said satellite, at least three beacons, each beacon located at a known geographical location, each beacon transmitting pulsed location data distinct for said beacon, a receiver/processor associated with said unit, said receiver/processor comprising a first receiver for receiving said pulsed location data from at least three of said multiplicity of beacons, a second receiver for receiving and analyzing said distinct time and position data from at least three of said satellites at any given time, a processor coupled to said first receiver and said second receiver to calculate the location of said unit from said pulsed location data and said distinct time and position data.

2. The apparatus of claim 1 wherein said receiver/processor includes a memory which stores coordinates of a user defined space.

3. The apparatus of claim 1 wherein a first antenna exterior to said line-of-sight barrier collects data transmitted by said satellites, a second antenna within said line-of-sight barrier coupled to said first antenna to rebroadcast said data collected by said first antenna.

4. The apparatus of claim 1 wherein each of said at least three beacons is ground based and mounted at an elevation, at least one of said at least three beacons disposed at an elevation different from the others of said beacons.

5. The apparatus of claim 1 wherein said receiver/processor includes a memory which stores coordinates of a defined space, said defined space behind a line-of-sight barrier from said satellites, a first antenna exterior to said line-of-sight barrier collects data transmitted by said satellites, a second antenna within said line-of-sight barrier coupled to said first antenna to rebroadcast said data collected by said first antenna.

6. The apparatus of claim 5 wherein said receiver/processor interrogates said memory to determine whether said receiver/processor is within said defined space, said receiver/processor disregarding said second receiver when said receiver/processor is within said defined space.

7. The apparatus of claim 6 wherein each of said at least three beacons transmits said location data by a time-modulated ultra wide band signal, said first receiver receiving said time-modulated ultra wide band signals from said at least three beacons.

8. The apparatus of claim 7 wherein
each of said at least three beacons is ground based and mounted at an elevation,
at least one of said at least three beacons is disposed at an elevation different from the others of said at least three beacons.

9. The apparatus of claim 8 wherein
at least one of said at least three beacons is disposed at a location separated from said receiver/processor by said line-of-sight barrier.

10. The apparatus of claim 6 wherein
said receiver/processor disregards said signals from said at least three beacons when said receiver/processor is outside said defined space.

11. A system for providing location and navigation data to a unit on or near the surface of the earth comprising
a system of earth-orbiting satellites, each satellite transmitting distinct time and position data identifiable with said satellite,
a multiplicity of at least three beacons, each beacon located at a known geographical location, each beacon transmitting pulsed location data distinct for said beacon,
a first antenna for receiving said distinct time and position data from at least three of said satellites, said first antenna disposed within line of sight of said satellites,
a second antenna disposed separated by a barrier from line of sight of said satellites, said second antenna coupled to said first antenna,
said second antenna repeatingly broadcasting said time and position data received by said first antenna,
a receiver/processor associated with said unit,
said receiver/processor comprising
  a receiver for receiving said pulsed location data from at least three of said multiplicity of beacons,
  a GNSS receiver for receiving and analyzing said distinct time and position data repeated by said second antenna,
  a processor coupled to said receiver and said GNSS receiver to calculate the location of said unit from said pulsed location data or from said distinct time and position data.

12. The system of claim 11 wherein
said receiver/processor includes a memory,
said memory having stored therein coordinates of a defined location,
said receiver/processor interrogating said memory to determine whether said receiver/processor is located within said defined location.

13. The system of claim 12 wherein
said receiver/processor disregards said distinct time and position data repeated by said second antenna when said receiver/processor is located within said defined location.

14. A system for providing location and navigation data to a unit on or near the surface of the earth comprising
a system of earth-orbiting satellites, each satellite transmitting distinct time and position data identifiable with said satellite,
a multiplicity of at least three beacons, each beacon located at a known geographical location, each beacon transmitting pulsed location data distinct for said beacon,
a receiver/processor associated with said unit,
said receiver/processor comprising
  a first receiver for receiving said pulsed location data from at least three of said multiplicity of beacons,
  a GNSS receiver for receiving and analyzing said distinct time and position data transmitted by at least three of said earth-orbiting satellites,
  a processor coupled to said first receiver and said GNSS receiver to calculate the location of said unit from said pulsed location data and said distinct time and position data,
  a memory element coupled to said processor to receive and store parameters of a defined space,
  said receiver/processor interrogates said memory element to determine whether said receiver/processor is within said defined space,
  said receiver/processor disregarding said GNSS receiver when said receiver/processor is within said defined space.

15. The system of claim 14 wherein
a first antenna receives said distinct time and position data from at least three of said satellites, said first antenna disposed within line of sight of said satellites,
a second antenna disposed separated from said satellites by a line of sight barrier, said second antenna coupled to said first antenna,
said second antenna repeatingly broadcasting said time and position data received by said first antenna.

16. The system of claim 15 wherein
said GNSS receiver receives said time and position data broadcast by said second antenna when said receiver/processor is within said defined space.

17. A method of determining location and navigation information about a mobile unit having a receiver/processor associated therewith, the mobile unit moveable without and within line of sight of a system of earth-orbiting satellites, each satellite transmitting signals with distinct location and time data, comprising the steps of
receiving signals by the receiver/processor from the system of earth-orbiting satellites,
receiving signals by said receiver/processor from at least three ground-based beacons, each beacon transmitting distinct location data by pulsed transmissions,
interrogating a database of coordinates to determine when said signals from said system of earth-orbiting satellites should be disregarded,
calculating the location of said mobile unit from said signals received from said system of earth-orbiting satellites or from said at least three ground-based beacons.

18. The method of claim 17 further including the steps of
disregarding said signals from said system of earth-orbiting satellites when said mobile unit is within a defined space.

19. The method of claim 18 further including the steps of
receiving said signals from said system of earth-orbiting satellites at a first antenna exterior to said line-of-sight barrier,
rebroadcasting said signals from said system of earth-orbiting satellites at a second antenna within said line-of-sight barrier.

20. The method of claim 19 further including the step of
transmitting said location data from said at least three beacons by time-modulated ultra wide band transmission.

21. The apparatus to determine the location and navigational movement of a unit on or near the surface of the earth of claim 1 wherein the location is in global co-ordinates.

22. The system of claim 11 wherein the location is in global co-ordinates.

23. The system of claim 14 wherein the location is in global co-ordinates.

24. The method of claim 17 wherein the location is in global co-ordinates.

25. A system for providing location and navigation data to a unit on or near the surface of the earth comprising
- a system of earth-orbiting satellites, each satellite transmitting distinct time and position data identifiable with said satellite,
- a multiplicity of at least three beacons, each beacon located at a known geographical location, each beacon transmitting pulsed location data distinct for said beacon,
- a first antenna for receiving said distinct time and position data from at least three of said satellites, said first antenna disposed within line of sight of said satellites,
- a second antenna disposed separated by a barrier from line of sight of said satellites, said second antenna coupled to said first antenna,
- said second antenna repeatingly broadcasting said time and position data received by said first antenna,
- a receiver/processor carried on said unit,
- said receiver/processor comprising
  - a receiver for receiving said pulsed location data from at least three of said multiplicity of beacons,
  - a GNSS receiver for receiving and analyzing said distinct time and position data repeated by said second antenna,
  - a processor coupled to said receiver and said GNSS receiver calculating the location of said unit from said pulsed location data or from said distinct time and position data.

26. A system for providing location and navigation data to a unit on or near the surface of the earth comprising
- a system of earth-orbiting satellites, each satellite transmitting distinct time and position data identifiable with said satellite,
- a multiplicity of at least three beacons, each beacon located at a known geographical location, each beacon transmitting pulsed location data distinct for said beacon,
- a receiver/processor carried on said unit,
- said receiver/processor comprising
  - a first receiver for receiving said pulsed location data from at least three of said multiplicity of beacons,
  - a GNSS receiver for receiving and analyzing said distinct time and position data transmitted by at least three of said earth-orbiting satellites,
  - a processor coupled to said first receiver and said GNSS receiver calculating the location of said unit from said pulsed location data and said distinct time and position data,
  - a memory element coupled to said processor to receive and store parameters of a defined space,
  - said receiver/processor interrogating said memory element to determine whether said receiver/processor is within said defined space,
  - said receiver/processor disregarding said GNSS receiver when said receiver/processor is within said defined space.

27. A method of determining location and navigation information about a mobile unit having a receiver/processor carried thereon, the mobile unit moveable without and within line of sight of a system of earth-orbiting satellites, each satellite transmitting signals with distinct location and time data, comprising the steps of
- receiving signals by the receiver/processor from the system of earth-orbiting satellites,
- receiving signals by said receiver/processor from at least three ground-based beacons, each beacon transmitting distinct location data by pulsed transmissions,
- interrogating a database of coordinates to determine when said signals from said system of earth-orbiting satellites should be disregarded,
- calculating the location of said mobile unit from said signals received from said system of earth-orbiting satellites or from said at least three ground-based beacons.

28. The apparatus of claim 1 wherein each beacon transmits pulsed location data by ultra wide band transmission.

29. The system of claim 11 wherein each beacon transmits location data by ultra wide band transmission.

30. The system of claim 14 wherein each beacon transmits location data by ultra wide band transmission.

31. The method of claim 17 further including the step of transmitting said location data from said at least three beacons by ultra wide band transmission.

* * * * *

UNITED STATES PATENT AND TRADEMARK OFFICE
CERTIFICATE OF CORRECTION

PATENT NO. : 6,707,424 B1  Page 1 of 1
APPLICATION NO. : 09/686181
DATED : March 16, 2004
INVENTOR(S) : Snyder et al.

It is certified that error appears in the above-identified patent and that said Letters Patent is hereby corrected as shown below:

Col. 8, Line 16
DELETE: TRADEMARK-UWB"
ADD: --TM-UWB--

Col. 8, Line 17-18
DELETE: "TRADEMARK-UWB"
ADD: --TM-UWB--

Col. 8, Line 31
DELETE: TRADEMARK-UWB"
ADD: --TM-UWB--

Col. 8, Line 35
DELETE: "TRADEMARK-UWB"
ADD: --TM-UWB--

Signed and Sealed this

Thirtieth Day of November, 2010

David J. Kappos
*Director of the United States Patent and Trademark Office*